SPURIOUS-FREE PHASE-LOCKED CONTINUOUSLY TUNED
TRANSCEIVER SYSTEM
Filed July 20, 1966
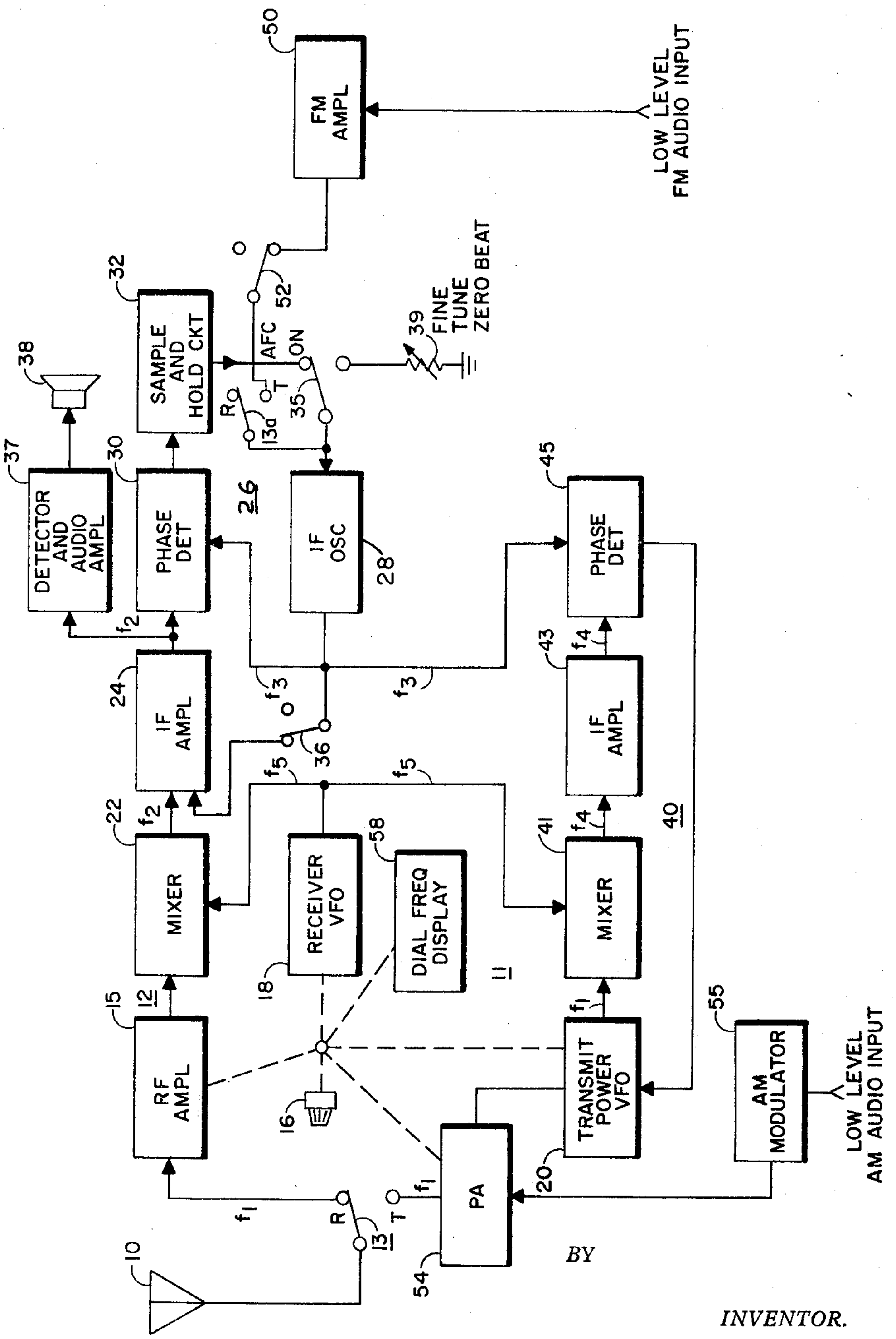
BY
INVENTOR.
ROBERT J. ERTMAN
By Raymond L. Owens
atty United States Patent Office 3,509,462
Patented Apr. 28, 1970

3,509,462
SPURIOUS-FREE PHASE-LOCKED CONTINUOUSLY TUNED TRANSCEIVER SYSTEM

Robert J. Ertman, Monroe, N.Y., assignor to General Dynamics Corporation, a corporation of Delaware Filed July 20, 1966, Ser. No. 566,633
Int. Cl. H04b *1/40*
U.S. Cl. 325—17 9 Claims

ABSTRACT OF THE DISCLOSURE

A transceiver system for transmitting on identically the same frequency as the frequency of a received signal is described. The receiver and transmitter channels have independent phase locked loops. The variable frequency oscillator in the receiver phase locked loop operates at the receiver IF frequency and applies a reference signal to the phase detector in the transmitter phase locked loop. A sample and hold circuit in the receiver phase locked loop insures that the intermediate frequency variable frequency oscillator stays on the received frequency even during transmitting operation.

This invention relates to systems for generating RF signals, and more particularly to a transceiver which provides an output signal which tracks a received signal.

One application of the present invention, wherein it is particularly suitable, is in a continuously tunable transceiver system where it is desired to precisely track a non-cooperative low power level received communication signal and transmit a high power level signal with a carrier frequency identical to that of the received signal without transmitting spurious signals.

Heretofore, a number of attempts have been made to eliminate spurious signals in transceiver systems. A common approach has been by employing special purpose filters coupled to the mixer of the transceiver which is adapted to develop the output signal. Although such circuits have been somewhat effective, they are still subject to drawbacks inasmuch as it is often difficult for them to distinguish between the wanted signal of a predetermined frequency and spurious signals of frequencies close to the predetermined frequency. Upon analysis, it has been determined that a major contributor to spurious frequencies is the output mixing process.

In view of the foregoing, it is an object of the present invention to substantially reduce spurious signals in the output of transceiver systems.

It is a further object of the present invention to provide a transceiver which accurately tracks the received signal and produces a spurious-free output signal directly from a tunable oscillator, eliminating a prior art method of output signal generation by means of a mixing process.

It is a still further object of the invention to provide an improved transmitter wherein the output signal frequency may be precisely selected.

It is a still further object of the invention to provide an improved frequency modulation transmitter.

Briefly described, a transceiver system embodying the invention employs a phase locked loop in each of its transmitting and receiving channels. These loops are locked together by means of a stable oscillator, which has its output signal adjusted by the phase locked loop in the receiver channel.

More particularly, in an exemplary embodiment each of the channel phase locked loops is responsive to the output signal of a stable IF oscillator. The IF oscillator is adapted to be automatically tuned through the receiver phase locked loop and is arranged to inject its output signal into the transmitter phase locked loop, insuring that the transmitted output signal will be locked to the received signal. The output signal of the transmitter is developed directly by a variable frequency oscillator which is adjusted by an error correcting signal developed by the transmitter phase locked loop when the frequency of the output signal varies from the received frequency.

The invention itself, both as to its organization and method of operation, as well as additional objects and advantages thereof will become more readily apparent from a reading of the following description in connection with the accompanying drawing which is a block diagram of an exemplary transceiver system in accordance with the invention.

As shown in the drawing, a representative transceiver includes an antenna 10 coupled to a transmitting channel 11 and a receiving channel 12 by means of a conventional duplexing system shown for convenience of illustration as a T-R switch 13.

With the transceiver in the receiving mode, a received RF signal, say of frequency $f_1$ is first delivered from the antenna 10 to a tunable RF amplifier circuit 15 which is manually tuned to approximately the received frequency $f_1$ by means of a tuning control 16. The control 16 is also arranged to tune the following elements: a receiver variable frequency oscillator (VFO) 18 to a frequency $f_5$; a transmitter VFO 20 to approximately the received frequency $f_1$, and a power amplifier 54 which is connected between the transmitter VFO 20 output and the transmit terminal of the switch 13. It should be noted that the frequency $f_5$ is equal to the sum of $(f_1+f_2)$ wherein $f_1$ is the received RF frequency and $f_2$ is the frequency produced by a mixer 22 to be described hereinafter. Further, it will be indicated that the VFO's 18 and 20 may suitably be provided by commercially available RF oscillators which preferably should be capable of being adjusted to within about .5% of their design value.

In operation, the signal from the RF amplifier 15 is applied to the mixer or first detector 22 to which is also applied the locally generated, receiver VFO injection frequency $f_5$. Accordingly, the difference between the mixer product of $f_5$ and $f_1$ will produce the IF frequency $f_2$ which is amplified in an IF amplifier stage 24.

Preferably, the oscillator 18 should be characterized by good stability so that injection frequency $f_5$ for the mixer 22 is maintained at the proper setting of the manual tuning control 16, which will help to insure the tracking accuracy of the transceiver. An appropriate Colpits or Clapp oscillator is suitable for use here.

A portion of the output signal $f_2$ of the IF amplifier 24 is fed to a receiver phased lock loop 26 which functions to provide an error signal to a variable frequency local oscillator (VFO) 28 operating at a nominal IF frequency $f_3$ and thus is called an IF oscillator. The loop 26 includes a phase detector network 30, having in its output a low pass filter and amplifier stage. A sample and hold circuit 32 is connected to the phase detector 30 output and is connected via a switch 35 to a frequency control circuit (e.g. a variable capacity diode) of the IF oscillator 28.

Detecting and audio circuitry 37 converts any audio beat note between the IF oscillator 28 and IF amplifier outputs into a signal which is made audible in a speaker 38. This circuitry and speaker also provide for monitoring the received signal since they are connected at all times to the IF amplifier 24 output. The circuitry 37 may include an FM detector as well as an AM detector for monitoring either type of signal. In order to make use of this audible signal for tuning the IF oscillator 28, the manual switch 35 is moved to its off position disabling the receiver phase locked loop 26. Manual adjustment of the oscillator 28 is now accomplished by means of changing the setting of an electronic, fine tuning control, variable resistor 39, which is connected to the tuning circuits in the oscillator 28. During a manual adjustment operation, an operator would listen to the speaker 38, coupled to the detector and audio circuits 37, and adjust the resistor 39 until zero beat is reached. At this time, the oscillator 28 is properly adjusted to be within the hold-in range of the loop 26. The phase locked loop 26 is now placed in operation by moving the switch 35 to its "on" position. A zero beat audio switch 36 connects the oscillator 28 to the input of the IF amplifier. Of course, when the switch 35 is opened the switch 36 will be closed and at that time convey the IF oscillator signal $f_3$ to the input of the IF amplifier 24.

With the loop 26 properly operating, if there is any deviation between the IF frequency output $f_2$ of the amplifier 24 and the nominal IF frequency $f_3$ developed by the transmit IF oscillator 28, a DC error signal is developed by the phase detector network 30 and delivered to the oscillator 28 by way of the sample and hold circuitry 32, causing a correction of the nominal IF frequency $f_3$ of the oscillator 28 until it zero beats the IF frequency $f_2$ in the detector 30.

In operation, if the nominal IF frequency $f_3$ and the IF frequency $f_2$ differ slightly, a DC voltage will be developed at the output of the phase detector 30, which voltage may be applied to a voltage variable capacitor (VVC) in the output of the tank circuit of the oscillator 28, causing a change in the nominal IF frequency $f_3$, in the proper sense, so as to reduce the error signal of the network 30 to zero. It is a requirement of the system that the oscillators 18 and 28 be relatively stable since the overall system stability depends on the sum of these oscillator stabilities. Clapp or Colpits oscillator configurations will be suitable for use, in that such oscillators are stable and are not dependent upon variations in active circuit elements therein (viz. transistors).

The sample and hold circuit 32 has been provided inasmuch as after the T-R switch 13 is moved to the transmit position, the oscillator 28 should be maintained at the adjusted IF frequency $f_3$ during the time interval when the receiver channel 11 is inoperative. Such electronic sample and hold circuitry 32 may consist of a capacitor in the output of arrangement of an operational feedback amplifier which is discharged at the beginning of each receive period as by a pulse generated upon operation of the pulse transmit switch into its receive position. The gating and pulse generating circuit for providing such pulse is not shown to simplify the illustration.

Alternatively, the function of the sample and hold circuit may be accomplished by a motorized AFC loop in which a mechanically tuned oscillator 28 is driven by a servo motor which is alternately braked during the hold (transmit) time and unbraked during the receive time interval.

Both the receiver VFO 18 and the IF oscillator 28 inject signals to a second phase lock loop 40 which is located in the transmitter channel 12, and moreover the loop 40 is arranged to adjust the output frequency $f_1$ of the oscillator 20 to be the same as (to track) the received RF frequency, due to the feature of having the two loops 40 and 26 locked together by the common IF oscillator 28. As will be recalled at this time, the transmitter VFO 20 is mechanically ganged to and initially set by the tuning control 16. The main output from the VFO 20 is applied to the antenna 10 by way of the duplexer switch 13 and as such as free from spurious output signals produced in prior arrangements where this output signal was produced by a mixing process.

A portion of the output of the oscillator 20 is fed into the loop 40 and combined in a mixer 41 with injection frequency $f_5$ resulting in an IF frequency output $f_4$ corresponding closely to the frequency $f_2$ in channel 11.

The output of the mixed 41 is delivered to a tuned IF amplifier 43 which in turn delivers an input to a phase detector network 45 similar to the detector 30 receiving a second input from the IF oscillator 28. If there is any difference between these two signals, a DC control or error signal will be fed back to the oscillator 20 adjusting same until a quadrature phase locked DC output zero condition is reached in the circuit 45.

The control loop 40 of the transmitter channel 12 is capable of being employed in a number of arrangements which require a spurious free output signal and as such is not limited to transceivers. For example, if it is desired to provide a transmitter having a very stable output signal, a frequency synthesizer may be used to provide the locking signals $f_5$ and $f_3$.

Several variations of the described embodiment have been shown. For example, if frequency modulated signals are desired, a low level audio modulation amplifier 50 could be connected to and adapted to apply an FM audio input to the tuning voltage input of the IF oscillator 28 via a switch 52 which is in series with another section 13a of the transmit receive switch. In addition, if AM signals are desired, the cathode of the power amplifier 54 could be connected to a low level AM modulator 55. Those skilled in the art will appreciate that simultaneous AM and FM signals may be provided.

Reviewing the transceiver operation, the oscillator 28 produces a signal of frequency $f_3$ which is injected into the control loop 26, where it is compared against the receiver IF frequency $f_2$. The control loop 26 is adapted to accurately adjust the IF oscillator frequency $f_3$ to be phase-locked to the received signal IF frequency $f_2$. The oscillator output $f_3$ is also injected into the transmitter control loop 40, where it is compared in the detector network 45 against an IF signal $f_4$ developed by the mixer 41. If there are any variations in the two signals, a DC error signal is developed by the network 45 and fed back to the output oscillator 20 adjusting its generated frequency $f_1$ until it exactly reproduces the RF received frequency $f_1$.

While a single embodiment of the invention has been described, variations thereof and modifications therein within the spirit of the invention will undoubtedly suggest themselves to those skilled in the art. For example, those skilled in the art will appreciate the fact that the depicted transceiver will be applicable for use in tracking CW, AM, and FM received signals. Accordingly, the foregoing descriptions should be taken as illustrative and not in any limiting sense.

What is claimed is:

1. A transceiver comprising (a) a receiver channel including (1) means for receiving an RF signal (2) a first variable frequency oscillator for developing a signal of a selected first injection frequency (3) first mixing means responsive to said RF received signal and said first injection signal for developing a first IF signal (b) a second variable frequency oscillator for developing a second IF signal, (c) a first phase locked loop including said second oscillator and being responsive to said first and second IF signals for adjusting said second oscillator so that said second IF signal is locked to said first IF signal, and (d) a transmitter channel including (1) an output oscillator for producing an output signal at said received RF frequency, (2) a phase locked loop including (i) said output oscillator, (ii) a mixer responsive to said first injection signal and said output oscillator signal for providing a third IF signal, and (iii) a phase detector responsive to said second and third IF signals for adjusting the quency of said output oscillator to be at said received RF frequency.

2. The invention as set forth in claim 1 wherein said transceiver includes an antenna and switching means for alternately connecting said receiver and said transmitting channels to said antenna and wherein said receiver channel phase locked loop includes a phase detector network adapted to develop an error signal and a sample and hold circuit for maintaining said error signal as an input to said second oscillator when said switching means is connected to said transmitting channel.

3. The invention as set forth in claim 2 including continuous tuning means for simultaneous adjusting said first oscillator and said output oscillator.

4. The invention as set forth in claim 1 including means for disabling said first phase locked loop, and means for manually adjusting the output frequency of said second oscillator.

5. The invention as set forth in claim 4 including audio output means adapted to receive a portion of said first IF signal FM audio signal input means, and means for connecting said oscillator to said FM audio signal input means when said transmitting channel is conditioned for operation.

6. A transmitter which is tunable in frequency comprising (a) a first variable frequency oscillator for developing an output signal for transmission, and (b) a first phase locked loop for adjusting the frequency of said first oscillator output signal comprising (1) a second variable frequency oscillator, (2) a first mixer means for receiving a portion of said first variable frequency oscillator output and said second variable frequency oscillator output and in response thereto producing a first IF output signal, (3) a source of variable frequency signals which is adjustable to be at a second IF frequency, said source including (i) a third variable frequency oscillator, (ii) means for automatically varying the frequency of said third oscillator in accordance with the frequency of an input signal, (iii) said last-named means comprising a second mixer responsive to said first variable frequency oscillator signal and said input signal, (iv) a phase locked loop including said third oscillator responsive to said second mixer output, and (4) means responsive to said second IF signal and said first IF signal for comparing them to produce an error signal and applying said error signal to said first oscillator for adjusting its output frequency.

7. The invention as set forth in claim 6 including a tuning means for continuously adjusting the frequencies of said first and second oscillators in synchronism with each other.

8. The invention as set forth in claim 6 including means for AM modulating the output signal of said first oscillator.

9. The invention as set forth in claim 6 further including means coupled to said third oscillator for frequency modulating said source signals.

References Cited

UNITED STATES PATENTS

| | | | |
|---|---|---|---|
| 2,507,139 | 5/1950 | Boosman | 325—17 |
| 2,790,072 | 4/1957 | Hugenholtz et al. | 325—17 |
| 2,846,572 | 8/1958 | Elliott | 325—17 |
| 2,958,768 | 11/1960 | Brauer | 325—17 |
| 3,195,059 | 7/1965 | Adams | 325—419 X |
| 3,413,554 | 11/1968 | Yates et al. | 325—17 |

ROBERT L. GRIFFIN, Primary Examiner

B. V. SAFOUREK, Assistant Examiner

U.S. Cl. X.R.

325—25, 177, 421